US007261445B2

(12) United States Patent
McBride et al.

(10) Patent No.: US 7,261,445 B2

(45) Date of Patent: Aug. 28, 2007

(54) LIGHTING KIT

(76) Inventors: Gary J. McBride, 16515 96th Ter. N., Jupiter, FL (US) 33478; Penny Perini McBride, 16515 96th Ter. N., Jupiter, FL (US) 33478

( * ) Notice: Subject to any disclaimer, the term of this patent is extended or adjusted under 35 U.S.C. 154(b) by 1091 days.

(21) Appl. No.: 10/434,601

(22) Filed: May 7, 2003

(65) Prior Publication Data

US 2004/0223334 A1 Nov. 11, 2004

(51) Int. Cl.
*F21S 13/10* (2006.01)
*F21V 3/00* (2006.01)
*H02G 3/08* (2006.01)

(52) U.S. Cl. ...................... 362/431; 362/382; 362/457; 174/50; 174/52.1; 174/61; 220/3.22

(58) Field of Classification Search ................ 362/431, 362/382–430, 432–457, 458; 174/50, 52.1, 174/61–64; 220/3.22–3.94
See application file for complete search history.

(56) References Cited

U.S. PATENT DOCUMENTS 1,777,509 A * 10/1930 Underwood ................ 362/431
3,679,891 A 7/1972 Quack
3,696,242 A 10/1972 Patry
3,866,034 A 2/1975 Russo
5,299,112 A * 3/1994 Nivette et al. .............. 362/431
6,017,131 A 1/2000 Goins
D442,323 S 5/2001 McBride
6,870,096 B2 * 3/2005 Suzuki et al. ................. 174/50

* cited by examiner

*Primary Examiner*—Thomas M. Sember
*Assistant Examiner*—James W Cranson, Jr.
(74) *Attorney, Agent, or Firm*—McHale & Slavin, P.A.

(57) ABSTRACT

A lighting kit includes all the components necessary to install a lighting fixture on a support post or pole. The components are made of polymeric materials to provide an electrically nonconducting enclosure attached to the support post and the fixture. A collar made of fiberglass reinforced polymer is attached to an electrical junction box. The collar has a tubular projection for connecting with the fixture. Spacer blocks are pivotally attached to the junction box and to the support post securing the kit to the post.

8 Claims, 2 Drawing Sheets

LIGHTING KIT

RELATED APPLICATIONS

This application is related to U.S. Design patent application 29/167,568 filed Sep. 16, 2002.

BACKGROUND OF THE INVENTION

1. Field of the Invention

This invention is related to safety outdoor lighting especially, illuminated mail box posts and border lights for walkways, driveways, swimming pools and gates.

2. Description of the Prior Art

There are many different structures shown in the prior art that function to illuminate mail boxes, street addresses, driveways and other outdoor facilities. For example, U.S. Pat. No. 6,017,131 to Goins teaches an internally lighted post with windows for illuminating a mail box and backlighting numbers on translucent panels.

Further, U.S. design patent, D442,323, by the present inventor shows a plastic slip fitter mounted between a post and a lantern.

Other pole or post mounted lighting fixtures are disclosed by U.S. Pat. No. 3,866,034 to Russo; U.S. Pat. No. 3,696,242 to Patry; and U.S. Pat. No. 3,679,891 to Quack. Each of these patents teaches a particular structural component that forms the connection between a support post and an electrical light fixture. All of these lighting fixtures are to be used outdoors, subject to weather and particularly water, but none of the patents mention or recognize the danger of electrical shock to people and animals through incidental contact with the devices.

What is needed in the art is an outdoor lighting assembly that is safe and isolates the electrical components from the surrounding supports and can be easily installed on existing supports.

SUMMARY OF THE PRESENT INVENTION

Disclosed is a lighting kit with all components necessary to install a lighting fixture on a support post or pole. The components provide an electrically nonconducting enclosure attached to the support post and the fixture. A collar, made of fiberglass reinforced polymer, is attached to an electrical junction box and includes a tubular projection for connecting with the fixture. Spacer blocks are pivotally attached to the junction box and to the support post securing the kit to the post.

Therefore, an objective of this invention is to provide a UL (Underwriters Laboratories) approved lighting kit for installation on existing poles or posts for supporting electrical fixtures for exterior use.

Another objective of this invention is to provide a kit containing all the components necessary for attaching and isolating an electrical light fixture from a support.

A further objective of this invention is to provide a lighting kit made from polymeric materials which do not conduct electrical energy.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
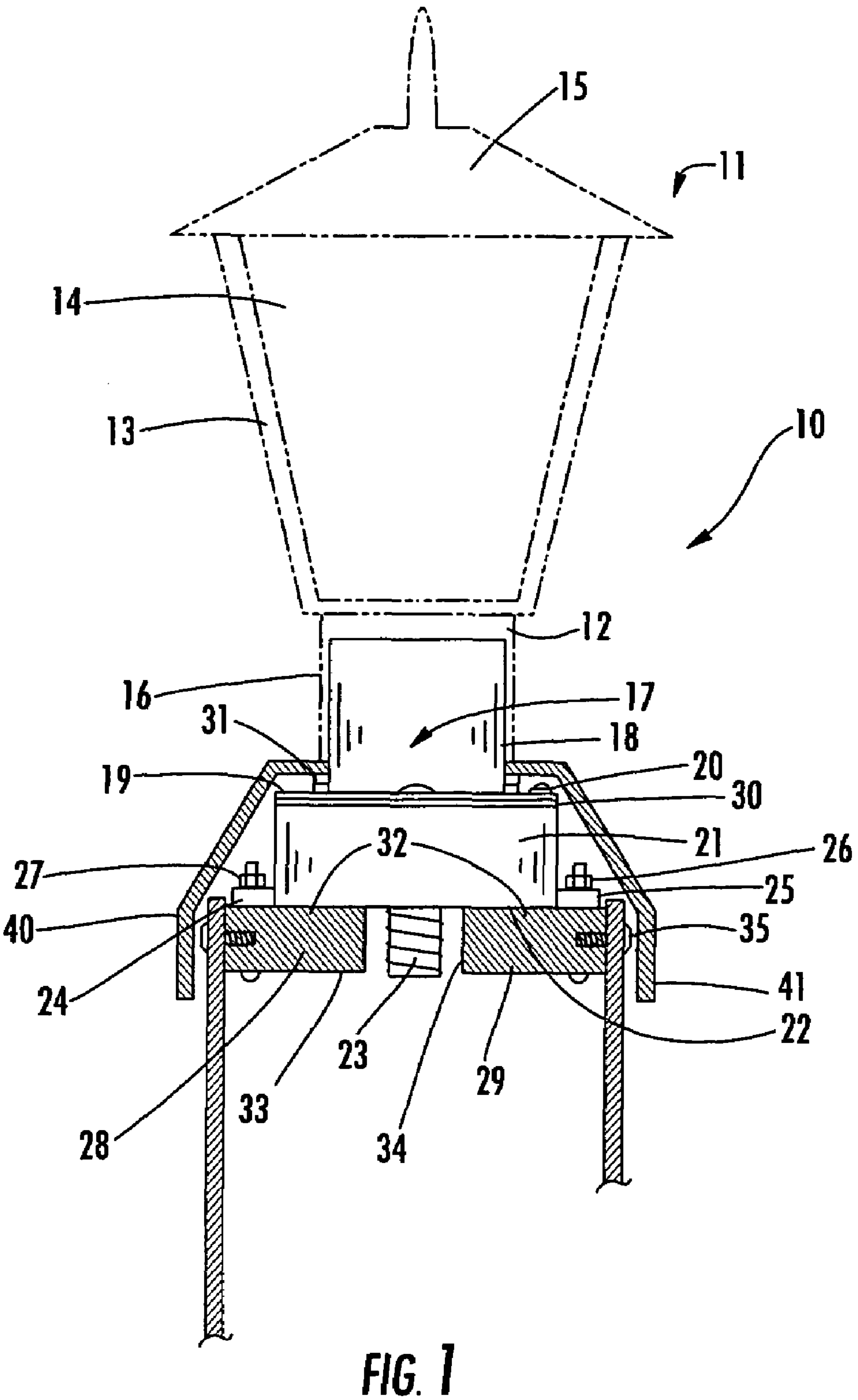
FIG. 1 is a front view, partially in section, of the lighting kit of this invention.

A complete exterior light 10 is shown in FIG. 1. A lantern 11 has a base 12 and a frame 13. Translucent or transparent panels 14 are mounted in the frame. A roof 15 closes the top of the lantern to make the lantern weatherproof. Inside the lantern 11 a light source (not shown) is attached to the base. In this instance an electric socket is provided for removably inserting a light bulb however, other sources may be used, such as candles and lamps. As shown in FIG. 1, the base 12 has a depending tubular mount 16 for telescoping over the collar 17 of the lighting kit assembly.

Figure 2:
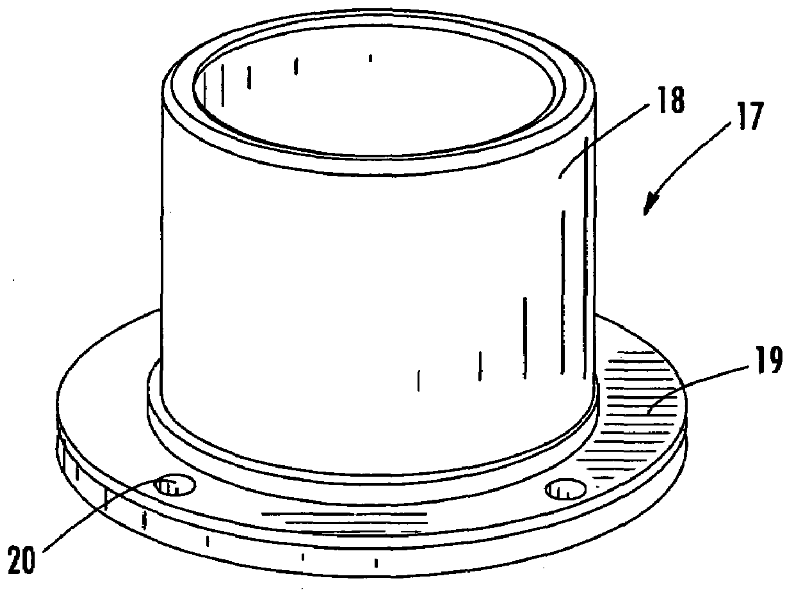
FIG. 2 is a perspective of the collar of the lighting kit of this invention.

The collar 17, as shown in FIG. 2, is molded of a polymer with a fiberglass reinforcement for strength and electrical nonconducting properties. It is important that the collar be able to withstand the weight of the lantern as well as the shear forces of wind and incidental contact because the electrical connection between the electric socket and the power source is located within the upstanding projection 18. It is this inherent strength and electrical properties that contribute to the Underwriters Laboratories (UL) listing of the device. The tubular projection 18 has a flange 19 formed about one end. The flange has a number of screw holes 20 about the periphery to accept screws or other fasteners for connection with the junction box 21. The flange is of a size to extend across and close the open mouth of an electrical junction box.

As shown in FIG. 1, the junction box 21 has a back plate 22 and a threaded nipple 23. A threaded coupling (not shown) may be used to attach a polymeric electrical conduit to the nipple. The electrical power cord passes through the nipple for connection to the electrical socket within the collar 17. Diametrically opposed ears 24 and 25 extend outwardly from the box in the same plane as the back plate 22. Each ear has an aperture for receiving a fastener 26 and 27 for attaching the junction box to the spacer blocks 28 and 29. The junction box 21 has a mouth 30 with ribs spaced about the circumference. The ribs have screw holes that mate up to the screw holes in the flange of the collar. Screw fasteners 31 connect the collar and the junction box.

The spacer blocks 28 and 29 are rectangular parallelpipeds with a major upper surface 32 and a major power surface 33 connected by a continuous sidewall 34. The length of the major surfaces is sized slightly less than the internal dimension of conventional hollow support posts to permit the spacer blocks to be placed inside the post. The continuous sidewall 34 has pre-drilled holes along the long dimension to accept fasteners passing through the wall of the hollow support post. As screw fasteners 35 are tightened, the spacer blocks are drawn into contact with the post.

Figure 3:
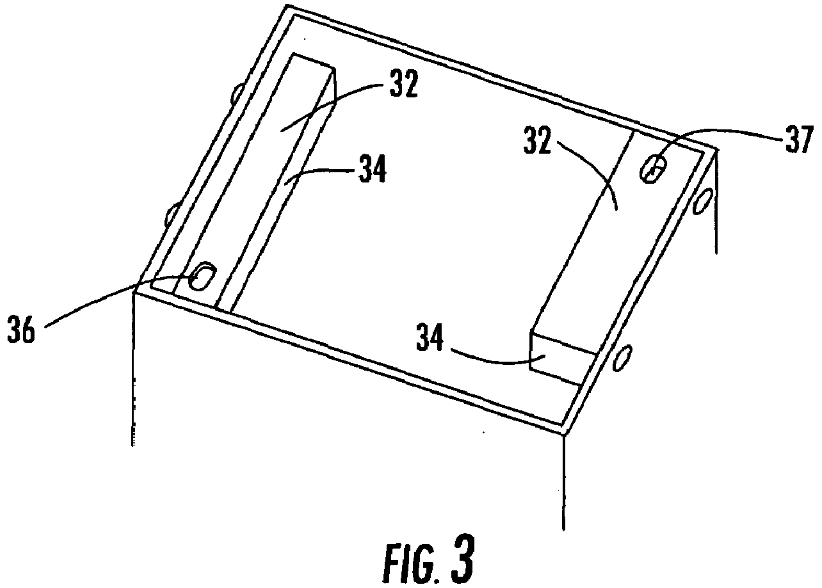
FIG. 3 is a perspective of a support post and the spacer blocks of this invention.

The spacer blocks, as shown in FIG. 3, each have at least one bore 36 and 37 extending from the lower major surface through the upper major surface. The bores are matched with the screw holes in each of the ears 24 and 25. Pivoting fasteners, such as nuts and bolts 26 and 27 connect the spacer blocks with the junction box. Because these bores are eccentric and the ears are diametric, the distance between the spacer blocks can be adjusted by rotating the junction box. This permits the kit to be used with support posts of different sizes.

A cover 40 is shown in FIG. 1. The cover gives an aesthetically pleasing finish to the installation. In addition, the cover 40 provides protection for the mechanical parts of the kit. The cover is held in place by the tubular projection 18 and a skirt 41 sized to telescope over the top edge of the support post.

Because the lighting kit is to be used outside and the support posts may be metal or other material, it is important to isolate the electrical connections from any conductor. To this end the components of this assembly are selected from polymers with sufficient strength to handle the weight and stress of outdoor usage and are electrically nonconducting, such as but not limited to polyethylene, polystyrene, Nylon, and others.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

What is claimed is:

1. A lighting kit for mounting a lighting fixture on a support post comprising an assembly of a junction box having a back plate, upstanding surrounding side walls, and an open mouth, said back plate having a connector extending therefrom in a direction opposite said side walls, said junction box having ears extending therefrom in the plane of said back plate outside said side walls and spaced 180 degrees from each other, each of said ears having a screw hole therethrough, said junction box formed of polymeric material, said junction box connected to at least one polymeric spacer block, said spacer block having an upper and a lower major surface of an elongated rectangular shape, said spacer block having a bore therethrough from said upper major surface to said lower major surface, a fastener extending through said spacer block and one of said ears securing said junction box to said spacer block, said open mouth of said junction box including vertical ribs with screw holes parallel with said side walls, a polymeric collar having a flange and an upstanding tubular projection, said flange having a plurality of screw holes therethrough, said flange of a size to close said open mouth, said collar attached to said junction box by a plurality of fasteners extending through said plurality of flange screw holes and said screw holes in said ribs whereby said assembly may be mounted on a support post by fasteners passing through said post and said spacer block.

2. A lighting kit of claim 1 wherein said collar is formed of a polymeric matrix reinforced with fiberglass to provide sufficient strength to carry a lighting fixture without deformation.

3. A lighting kit of claim 2 wherein said lighting fixture is an electric fixture and said assembly is made of a polymeric material with nonconducting properties.

4. A lighting kit of claim 2 wherein a second spacer block having an upper and a lower major surface with a bore therethrough is connected to the other of said ears by a fastener extending through said bore and said screw hole.

5. A lighting kit of claim 4 wherein said junction box pivots about said fasteners to change the distance between said spacer blocks whereby said assembly can be adjusted to fit different sized posts.

6. A lighting kit of claim 1 wherein said junction box and said collar are molded as one piece.

7. A lighting kit of claim 1 wherein said assembly includes a cover having an aperture and a skirt, said tubular projection of said collar extending through said aperture and said skirt adapted to surround said post.

8. A lighting kit for connecting a junction box and an electric light fixture to a support post comprising an assembly of polymeric materials having electrically nonconducting properties, a collar having a flange and an upstanding tubular projection, said flange having a plurality of screw holes therein, said flange adapted to be connected to said junction box by fasteners extending through said plurality of screw holes, said collar formed of a polymeric material with an integral fiberglass reinforcement, a plurality of spacer blocks, said spacer blocks being rectangular in shape with an upper and a lower major surface, a bore through each of said plurality of spacer blocks from one major surface to the other, said spacer blocks adapted to be connected to said junction box with fasteners through each of said bores whereby said assembly is adapted to be connected to said support post by said plurality of spacer blocks and an electric lighting fixture is adapted to be connected to said tubular connection.

* * * * *